United States Patent
Cho et al.

(10) Patent No.: US 8,556,725 B2
(45) Date of Patent: Oct. 15, 2013

(54) SCENARIO-BASED LOAD TESTING APPARATUS AND METHOD

(75) Inventors: Chang-Sik Cho, Daejeon (KR); Dong-Chun Lee, Daejeon (KR); Su-Young Bae, Daejeon (KR); Hang-Kee Kim, Daejeon (KR); Kang-Min Sohn, Daejeon (KR); Chang-Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 102 days.

(21) Appl. No.: 13/242,711

(22) Filed: Sep. 23, 2011

(65) Prior Publication Data
US 2012/0142424 A1    Jun. 7, 2012

(30) Foreign Application Priority Data
Dec. 1, 2010    (KR) .................. 10-2010-0121560

(51) Int. Cl.
*G07F 17/32*    (2006.01)

(52) U.S. Cl.
USPC .................. 463/42; 463/40; 463/41; 463/43; 463/44

(58) Field of Classification Search
USPC ..................................... 463/40–44
See application file for complete search history.

(56) References Cited

U.S. PATENT DOCUMENTS

| | | | |
|---|---|---|---|
| 2006/0084507 A1* | 4/2006 | Miyazaki | ........................ 463/43 |
| 2009/0156314 A1 | 6/2009 | Kim et al. | |
| 2011/0130205 A1 | 6/2011 | Cho et al. | |

FOREIGN PATENT DOCUMENTS

| | | |
|---|---|---|
| KR | 10-2009-0065747 | 6/2009 |
| KR | 10-2011-0061418 | 6/2011 |

OTHER PUBLICATIONS

Chang-Sik Cho et al, "Online Game Testing Using Scenario-based Control of Massive Virtual Users," HD Game Research Team, ETRI, 2010.

* cited by examiner

*Primary Examiner* — Omkar Deodhar
(74) *Attorney, Agent, or Firm* — Staas & Halsey LLP

(57) ABSTRACT

Disclosed herein is a scenario-based load testing apparatus and method. The scenario-based load testing apparatus includes a packet analysis unit, a scenario creation unit, and a load generation unit. The packet analysis unit creates a virtual map and game grammar by capturing and analyzing packets sent between a server and a client. The scenario creation unit creates a scenario of a virtual user on the virtual map. The load generation unit generates a load by creating packet data corresponding to the virtual user in compliance with the game grammar and the scenario.

10 Claims, 5 Drawing Sheets

SCENARIO-BASED LOAD TESTING APPARATUS AND METHOD

CROSS REFERENCE TO RELATED APPLICATION

This application claims the benefit of Korean Patent Application No. 10-2010-0121560, filed on Dec. 1, 2010, which is hereby incorporated by reference in its entirety into this application.

BACKGROUND OF THE INVENTION

1. Technical Field

The present invention relates generally to a scenario-based load testing apparatus and method and, more particularly, to a scenario-based load testing apparatus and method that create a virtual user based on a scenario and test the load of a game, thereby being able to verify the logic of a complicated game, reducing the time it takes to conduct a load test, and also increasing the efficiency of a test.

2. Description of the Related Art

In the software testing field in which the stability and performance of server applications for multiple users are automatically tested, the operation of creating a specific load, applying the load to a server, and then testing the stability of the server falls within the load test field from the viewpoint of software engineering, and also falls within the stress test field in which abnormal phenomena that occur on a server in a high-load state are observed. Meanwhile, the operation of analyzing the stability of a game server and a game by analyzing the logic of the game falls within the game quality assurance field.

In such fields, load generation systems using virtual users, which are capable of generating a large number of virtual users to conduct load tests, have been researched. Furthermore, in order to test the stability of a server in a network environment similar to an actual one, research into the addition of a structure for creating a virtual network circuit to a simulation environment has been carried out.

The conventional load generation systems using virtual users include systems that use captured packets without change, or systems that regenerate a load for each action by applying very simple manipulation to captured packets. The conventional load generation systems using virtual users focus on easy conducting of simple load and stress tests. That is, the conventional load generation systems use the method of capturing a specific packet sample of an actual client, performing appropriate manipulation on the packet sample, and sending a large amount of data to a server. Here, due to the characteristics of on-line games, simple packet manipulation is carried out for the cases where different information, such as a different ID, password and session key value, should be used for each session. That is, a great number of packets can be created in a simple, repetitive manner by manipulating a specific item found in a list of previously captured packets, thereby being able to apply different content to each session.

Since the above conventional load generation systems are capable of conducting merely very simple load tests, the utility of the tests is poor. In particular, an on-line game server employs complicated game logic compared to general server applications such as web services, and therefore there arises a problem in that it is difficult to test the stability of complicated logic using only the conventional systems.

SUMMARY OF THE INVENTION

Accordingly, the present invention has been made keeping in mind the above problems occurring in the prior art, and an object of the present invention is to provide a scenario-based load testing apparatus and method that create a virtual user based on a scenario and then tests the loads imposed on a server, thereby being able to verify the logic of a complicated game, reducing the time it takes to conduct a test, and also increasing the efficiency of the test.

In order to accomplish the above object, the present invention provides a scenario-based load testing apparatus, including a packet analysis unit for creating a virtual map and game grammar by capturing and analyzing packets sent between a server and a client; a scenario creation unit for creating a scenario of a virtual user on the virtual map; and a load generation unit for generating a load by creating packet data corresponding to the virtual user in compliance with the game grammar and the scenario.

The scenario creation unit may create the scenario by defining the locations of the virtual user on the virtual map and actions for the locations.

The scenario creation unit may create the scenario by describing the scenario in text script form.

In order to accomplish the above object, the present invention provides a scenario-based load testing method, including capturing packets sent between a server and a client; creating a virtual map by analyzing the packets; creating a game grammar by analyzing the packets; creating a scenario of a virtual user on the virtual map; and generating a load by creating packet data corresponding to the virtual user in compliance with the game grammar and the scenario.

The creating a scenario may include creating the scenario by defining locations of the virtual user on the virtual map and actions at the locations.

The creating a scenario may include creating the scenario by describing the scenario in text script form.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
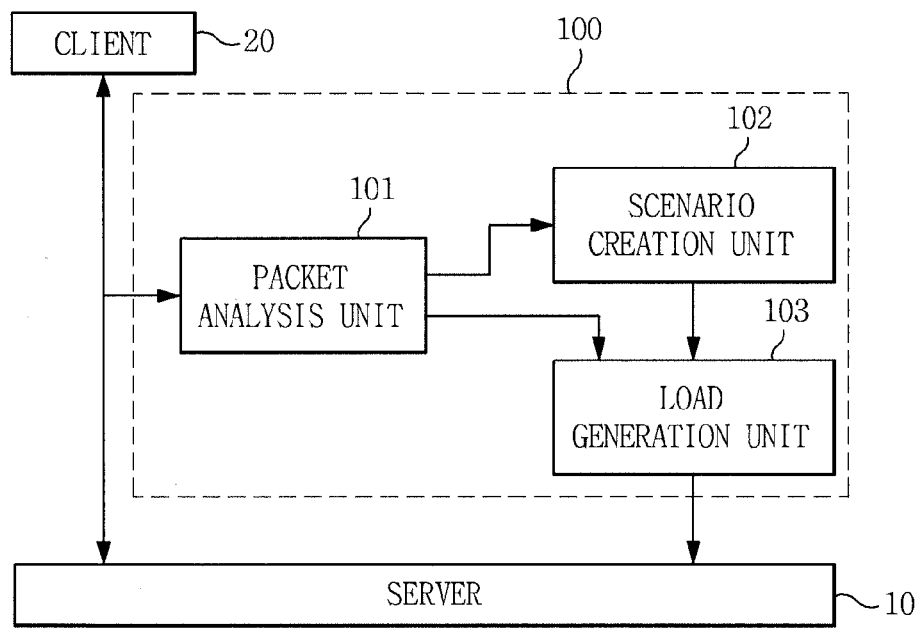
FIG. 1 is a drawing schematically illustrating a scenario-based load testing apparatus according to an embodiment of the present invention.

Reference now should be made to the drawings, in which the same reference numerals are used throughout the different drawings to designate the same or similar components.

The present invention will be described in detail below with reference to the accompanying drawings. Here, redundant descriptions and descriptions of well-known functions and elements that may unnecessarily make the gist of the present invention vague will be omitted. Embodiments of the present invention are provided to more fully describe the present invention to those having ordinary knowledge in the art to which the present invention pertains. Accordingly, the shapes and sizes of elements in the drawings may be exaggerated for the sake of clearer description.

FIG. 1 is a drawing schematically illustrating a scenario-based load testing apparatus 100 according to an embodiment of the present invention.

The scenario-based load testing apparatus 100 according to the embodiment of the present invention may include a packet analysis unit 101, a scenario creation unit 102, and a load generation unit 103. The scenario-based load testing apparatus 100 shown in FIG. 1 is merely an example, and therefore some components may be added, deleted or changed as necessary.

The packet analysis unit 101 captures and analyzes packets sent between a server 10 and a client 20, and then creates a virtual map and game grammar. The virtual map and game grammar created by the packet analysis unit 101 represent the logic of a game. The virtual map is a map on which a scenario will be executed, and the game grammar includes protocols and actions. A protocol is used to provide transmission and reception rules for each of the packets sent between the server and the client. Each of the actions is defined by grouping a series of packets that are selected from amongst the packets sent between the server and the client and that are indicative of a single unit action, such as a piece of movement, a combat, and an item trade, that is executed in a game. The detailed configuration of the packet analysis unit 101 will be described in detail later with reference to the accompanying drawing.

The scenario creation unit 102 is a unit that creates the scenario of the virtual user on the virtual map. The scenario creation unit 102 may create the scenario by defining the locations of the virtual user on the virtual map and actions at locations. Furthermore, the scenario creation unit 102 may receive the input of a user who conducts a test and then create the scenario using the input. The scenario may be created by describing the scenario in text script form. In this case, the creation of the scenario may be performed using a visual editor or a method of directly inputting text. The scenario created by the visual editor may be converted into a text script later in the final stage.

Furthermore, the scenario may include one or more control statements for supporting one or more repetitive actions. The control statement enables a user who is conducting the load test to minimize simple, repetitive work. This results in a reduction in the time that takes to conduct the load test of the game and increased test efficiency.

Figure 2:
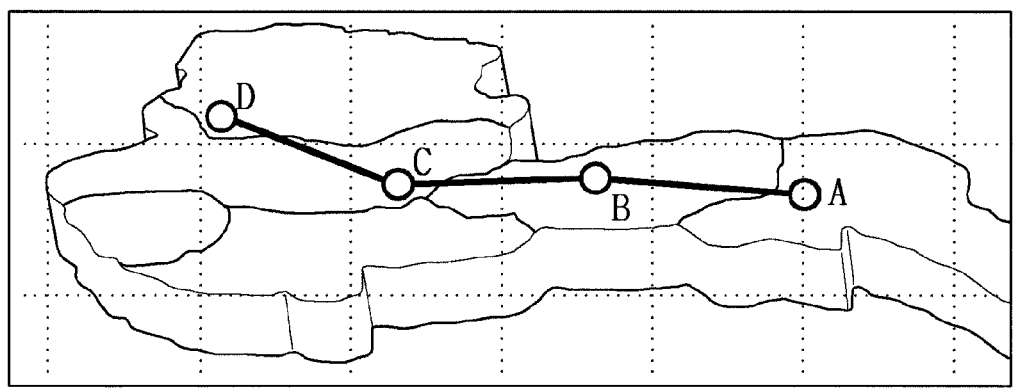
FIG. 2 shows an example of a scenario that may be used in the scenario-based load testing apparatus according to the embodiment of the present invention.

FIG. 2 shows an example of a scenario that may be used in the scenario-based load testing apparatus 100 according to the embodiment of the present invention.

As described above, a scenario may be created by defining the locations of a virtual user on a virtual map and actions at the locations. Referring to FIG. 2, the scenario is configured to define point A, point B, point C, and point D through which the virtual user sequentially passes across the virtual map and to define actions for the respective points. For example, the scenario may be configured to define actions for locations in such a way that: at point A, the virtual user is created and enters the virtual map to conduct the scenario; at point B, the virtual user catches 80 monsters and obtains an item; at point C, the virtual user collects 30 herbs; and at point D, the virtual user sells all obtained items and herbs to a Non-Player Character (NPC). As shown in FIG. 2, the virtual user performs the actions of the game, such as combat, collection and trade, at specific locations while sequentially passing through the specific locations. According to the present invention, the various actions of a game are performed by a virtual user, and therefore a realistic test resembling the behavioral patterns of an actual gamer can be conducted, unlike in existing simple load tests.

The scenario may be created by receiving the input of a user who is conducting the test, and may be created by describing the scenario in text script form. For example, the scenario shown in FIG. 2 may be described in text script form, as follows:

```
doAction LOGIN
moveTo 100,-3,50 (FORMATION=3)
doAction ATTACK
doAction LOOT
moveTo 200,300,90 (SPEEDTYPE=OPTIMAL)
doAction HERVAL
Delay 1.0
moveTo 200,300,90 (SPEEDTYPE=OPTIMAL)
doAction TRADE
End
```

In this case, the scenario script includes doAction and moveTo actions. 'moveTo' is used to move the virtual user to a desired point and 'doAction' is used to define an action of the virtual user, such as combat, collection or trade. The actions appearing in doAction keywords are preset in the game. In an embodiment, LOGIN may be preset to a login that must be performed to enter the virtual map, ATTACK to an attack, LOOT to the obtainment of an item, HERVAL to the collection of a herb, and TRADE to a trade.

The creation of the scenario may be performed using a visual editor or a method of directly inputting text. The scenario created by the visual editor may be converted into a text script later in the final stage.

Referring back to FIG. 1, the load generation unit 103 generates load in accordance with the game grammar created by the packet analysis unit 101 and the scenarios created by the scenario creation unit 102. That is, the load generation unit 103 generates load by creating packet data corresponding to the virtual user in accordance with the scenario, while referring to the game grammar. The scenario is configured to perform pieces of movement and actions, create a protocol for an action, and send the protocol to the server 10. Here, a plurality of created network loads refers to a plurality of network sessions, that is, a plurality of users. In an embodiment, the load generation unit 103 may include a scenario scheduler that parses a scenario, constructs a list of scenario elements, creates packet data for sequentially executing the scenario elements, and generates a load. The scenario scheduler reads and parses a scenario, that is, a text script file. Parsing results forms a list of scenario elements. The scenario scheduler sequentially executes the scenario elements at regular intervals in the system. When the overall scenario element list has been executed, the execution of the scenario is terminated. Each of the scenario elements includes a command to move to a corresponding location on the virtual map or an action, such as a combat or a collection, at the corresponding location. The detailed operation of the scenario scheduler will be described later in detail with reference to the accompanying drawing.

Figure 3:
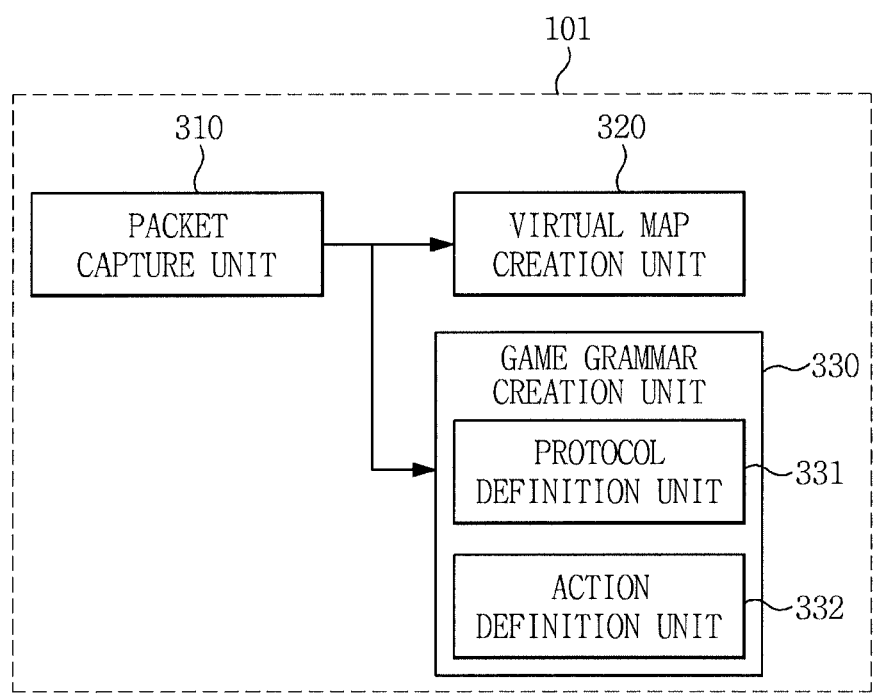
FIG. 3 is a drawing schematically illustrating the packet analysis unit of the scenario-based load testing apparatus according to the embodiment of the present invention.

FIG. 3 is a drawing schematically illustrating the packet analysis unit 101 of the scenario-based load testing apparatus according to the embodiment of the present invention.

Referring to FIG. 3, the packet analysis unit 101 of the scenario-based load testing apparatus according to the embodiment of the present invention may include a packet capture unit 310, a virtual map creation unit 320, and a game grammar creation unit 330. Here, the game grammar creation unit 330 may include a protocol definition unit 331, and an action definition unit 332. The packet analysis unit 101 of the scenario-based load testing apparatus shown in FIG. 3 is merely an example, and therefore some elements may be added, deleted, or changed as necessary.

The packet capture unit 310 captures packets sent between the server and the client. The process of capturing packets performed by the packet capture unit 310 is typically the process of collecting packets that are sent and received in connection with a single game play. The collected packets may be stored in list form.

The virtual map creation unit 320 creates a virtual map by analyzing the packets. The virtual map is a map on which the scenario will be executed.

The game grammar creation unit 330 is a unit that creates game grammar by analyzing the packets. The game grammar creation unit 330 may include a protocol definition unit 331, and an action definition unit 332. The protocol definition unit 331 defines a protocol indicative of transmission and reception rules for each of the packets sent between the server and the client, and the action definition unit 332 defines an action by grouping a series of packets that are indicative of a single unit action and that are selected from amongst the packets sent between the server and the client. For example, the action may be movement, combat, collection, trade, or party play. Here, the game grammar creation unit 330 may create the game grammar using such protocols and actions.

Figure 4:
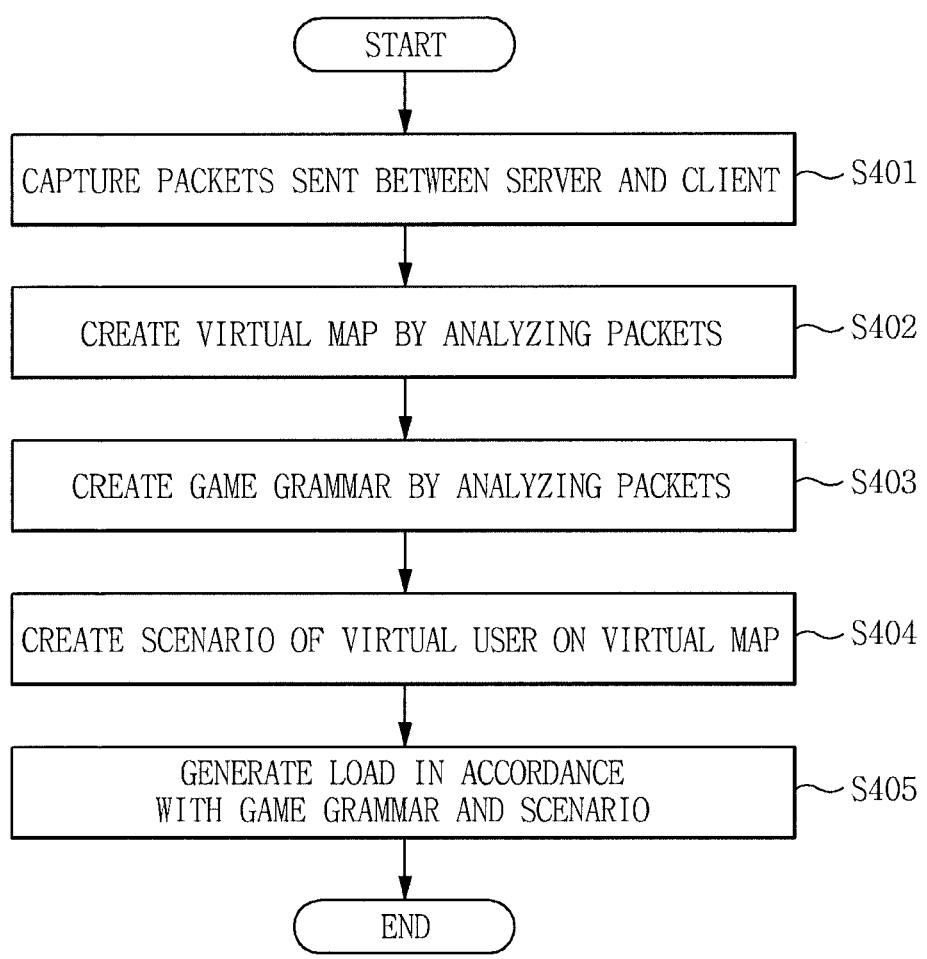
FIG. 4 is a flowchart illustrating a scenario-based load test method according to an embodiment of the present invention.

FIG. 4 is a flowchart illustrating a scenario-based load test method according to an embodiment of the present invention.

Referring to FIG. 4, when the scenario-based load test method according to the embodiment of the present invention starts, packets are captured between a server and a client at step S401. That is, step S401 is the step of typically collecting packets that are sent and received in connection with a single game play. The collected packets may be stored in list form.

Thereafter, a virtual map is created by analyzing the packets at step S402, and then game grammar is created at S403. The virtual map is a map on which a scenario will be executed, and the game grammar includes protocols and actions. Each of the protocols is indicative of transmission and reception rules for each of the plurality of packets sent between the server and the client. Each of the actions is defined by grouping packets that are indicative of a single unit action such as movement, combat, item trade, or the like and that are selected from amongst the plurality of packets sent between the server and the client.

Once the virtual map has been created at step S402 and the game grammar has been created at step S403, the scenario of the virtual user on the virtual map is created at step S404. At step S404, the scenario may be created by defining the locations of the virtual user on the virtual map and actions at the locations. Furthermore, at step S404, the scenario may be created by receiving the input of a user who conducts a test. The scenario may be created by describing the scenario in text script form. Here, the creation of the scenario may be performed using a visual editor or a method of directly inputting text. The scenario created by the visual editor may be converted into a text script later in the final stage.

Once the scenario has been created at step S404, a load is generated by creating packet data corresponding to the virtual user in compliance with the game grammar and the scenario at step S405. The scenario is configured to perform pieces of movement and actions, and creates a protocol for an action and sends the protocol to the server. Here, the plurality of created network loads refers to a plurality of network sessions, that is, a plurality of users.

Figure 5:
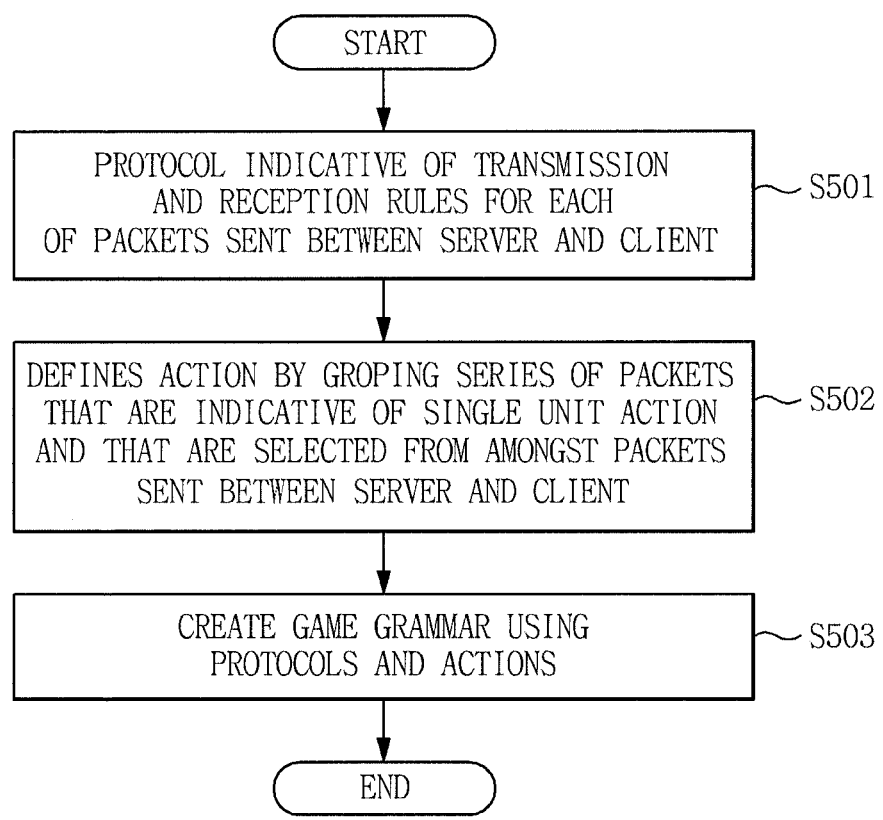
FIG. 5 is a flowchart illustrating the step of creating game grammar in the scenario-based load test method according to the embodiment of the present invention.

FIG. 5 is a flowchart illustrating the step of creating game grammar in the scenario-based load test method according to the embodiment of the present invention.

The step shown in FIG. 5 corresponds to step S403 shown in FIG. 4.

In the step of creating game grammar in the scenario-based load test method according to the embodiment of the present invention, first, a protocol indicative of transmission and reception rules for each of a plurality of packets sent between the server and the client is defined at step S501. Furthermore, an action is defined by grouping a series of packets that are selected from amongst the plurality of packets and that are indicative of a single unit action performed in a game at step S502. For example, the action may be movement, combat, collection, trade, and party play. Once the protocols and actions have been defined at steps S501 and S502, the game grammar is created using the protocols and the actions at step S503.

Figure 6:
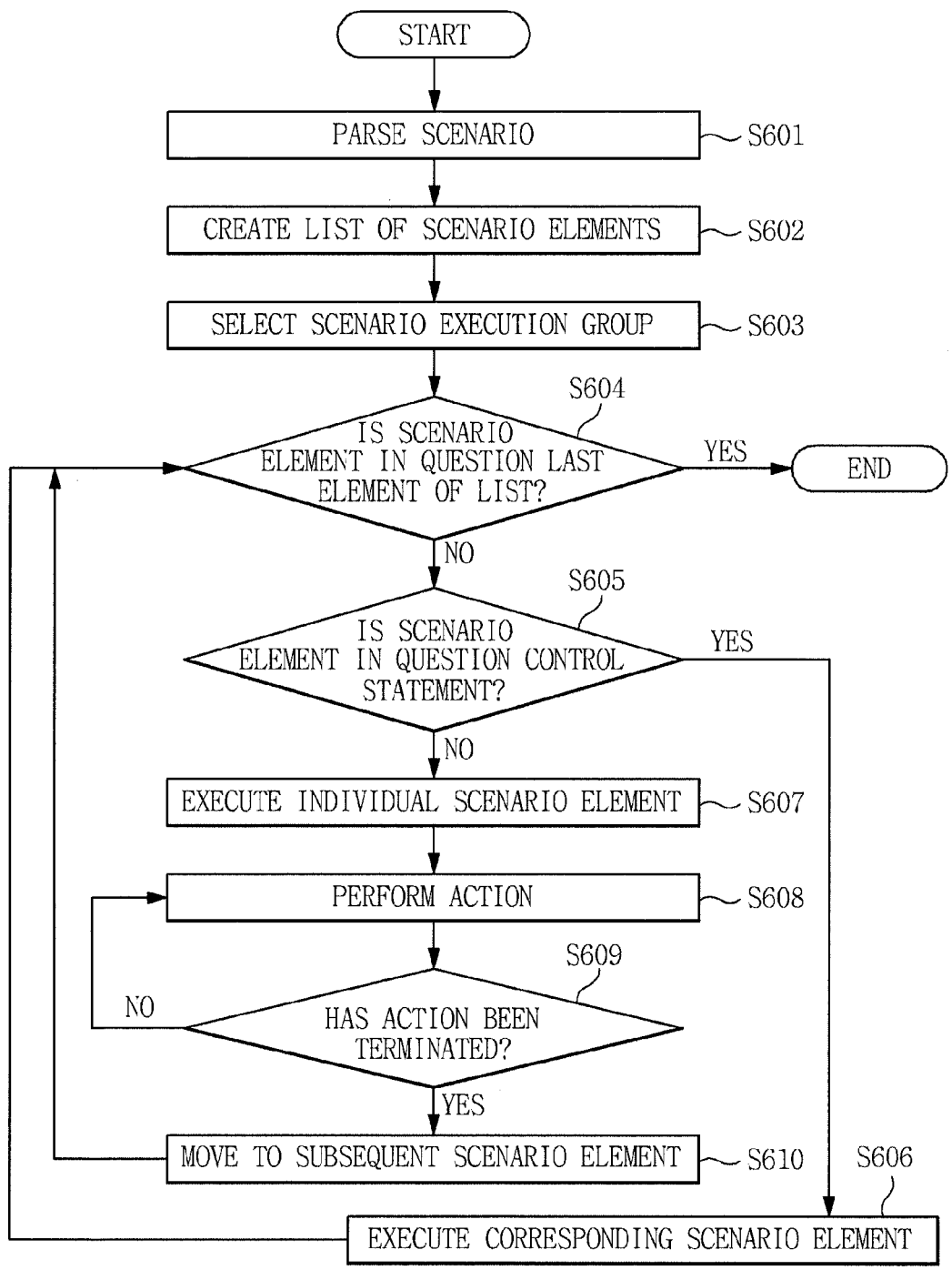
FIG. 6 is a flowchart illustrating the load creation operation of the scenario scheduler in the scenario-based load testing apparatus and method according to the embodiments of the present invention.

FIG. 6 is a flowchart illustrating the load creation operation of the scenario scheduler in the scenario-based load testing apparatus and method according to the embodiments of the present invention.

First, the scenario scheduler reads and parses a scenario, that is, a text script file at step S601. A scenario element list is created using parsing results at step S602. A virtual user group that will execute the corresponding scenario is selected at step S603. Once the scenario to be executed has been designated, the scenario scheduler sequentially executes scenario elements in the system. It is determined whether an element in question is the last element of the scenario element at step S604. If the element is the last element, the execution of the scenario is terminated. Each of the scenario elements includes a command to move to a corresponding location on a virtual map or an action, such as combat or collection, at the corresponding location. The scenario supports control statements so that it can support simple, repetitive actions. Accordingly, it is determined whether a scenario element in question is a control statement at step S605. If the element is a control statement, a conditional expression is examined by executing the corresponding scenario element and execution is controlled in compliance with the conditional expression at step S606.

If the scenario element is not a control statement, the scenario element is executed at step S607, and an action is performed at step S608. Each of the scenario elements is indicative of a user's movement or an action at a corresponding location. Such actions are previously defined as "actions" in the virtual user system. Each action of the virtual user system is configured to prescribe time rules and game protocol packets that can be actually sent to the game server. Once the action has been terminated at step S609, the scenario element is terminated and then the subsequent element of the list is executed at step S610.

The above-described scenario-based load testing apparatus and method according the present invention are configured to create a virtual user based on a scenario and to test the load imposed on a server, so that they have the advantages of being able to verify the logic of a complicated game, reduce the time it takes to conduct a load test, and increase the efficiency of the test.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scenario-based load testing apparatus, comprising:
    a packet analysis unit for creating a virtual map and game grammar by capturing and analyzing packets sent between a server and a client;
    a scenario creation unit for creating a scenario of a virtual user on the virtual map; and
    a load generation unit for generating a load by creating packet data corresponding to the virtual user in compliance with the game grammar and the scenario,
    wherein the scenario creation unit creates the scenario by defining locations of the virtual user on the virtual map and actions for the locations.

2. The scenario-based load testing apparatus as set forth in claim 1, wherein the scenario creation unit creates the scenario by describing the scenario in text script form.

3. The scenario-based load testing apparatus as set forth in claim 1, wherein the scenario includes one or more control statements for supporting one or more repetitive actions.

4. The scenario-based load testing apparatus as set forth in claim 1, wherein the packet analysis unit comprises:
    a packet capture unit for capturing packets sent between the server and the client;
    a virtual map creation unit for creating the virtual map by analyzing the packets; and
    a game grammar creation unit for creating the game grammar by analyzing the packets.

5. The scenario-based load testing apparatus as set forth in claim 4, wherein the game grammar creation unit comprises:
    a protocol definition unit for defining a protocol indicative of transmission and reception rules for each of the packets sent between the server and the client; and
    an action definition unit for defining an action by grouping packets that are selected from amongst the packets sent between the server and the client and that are indicative of a single unit action that is executed in a game;
    wherein the game grammar is created using the protocols and the actions.

6. The scenario-based load testing apparatus as set forth in claim 1, wherein the load generation unit comprises a scenario scheduler for constructing a list of scenario elements by parsing the scenario and for generating a load by creating the packet data that sequentially executes the scenario elements.

7. A scenario-based load testing method, comprising:
    capturing packets sent between a server and a client;
    creating a virtual map by analyzing the packets;
    creating a game grammar by analyzing the packets;
    creating a scenario of a virtual user on the virtual map; and
    generating a load by creating packet data corresponding to the virtual user in compliance with the game grammar and the scenario,
    wherein the creating a scenario comprises creating the scenario by defining locations of the virtual user on the virtual map and actions at the locations.

8. The scenario-based load testing method as set forth in claim 7, wherein the creating a scenario comprises creating the scenario by describing the scenario in text script form.

9. The scenario-based load testing method as set forth in claim 7, wherein the creating a game grammar comprises:
    defining a protocol indicative of transmission and reception rules for each of the packets sent between the server and the client;
    defining an action by grouping packets that are selected from amongst the packets sent between the server and the client and that are indicative of a single unit action that is executed in a game; and
    creating the game grammar using the protocols and the actions.

10. The scenario-based load testing method as set forth in claim 7, wherein the generating a load comprises:
    constructing a list of scenario elements by parsing the scenario; and
    generating the load by creating the packet data that sequentially executes the scenario elements.

* * * * *